United States Patent
Lin et al.

(10) Patent No.: US 10,529,092 B2
(45) Date of Patent: Jan. 7, 2020

(54) METHOD FOR REDUCING MATCHING ERROR IN DISPARITY IMAGE BY INFORMATION IN ZOOM IMAGE

(71) Applicant: Create Electronic Optical Co., Ltd., New Taipei (TW)

(72) Inventors: Huei-Yung Lin, Chia-Yi (TW); Yu-Ting Chen, New Taipei (TW)

(73) Assignee: CREATE ELECTRONIC OPTICAL CO., LTD., New Taipei (TW)

( * ) Notice: Subject to any disclaimer, the term of this patent is extended or adjusted under 35 U.S.C. 154(b) by 18 days.

(21) Appl. No.: 15/844,195

(22) Filed: Dec. 15, 2017

(65) Prior Publication Data

US 2018/0189979 A1    Jul. 5, 2018

(30) Foreign Application Priority Data

Dec. 30, 2016 (TW) .............. 105144186 A

(51) Int. Cl.
| | |
|---|---|
| *G06K 9/00* | (2006.01) |
| *G06T 7/00* | (2017.01) |
| *G06K 9/46* | (2006.01) |
| *G06T 7/593* | (2017.01) |
| *G06K 9/62* | (2006.01) |
| *H04N 13/122* | (2018.01) |

(Continued)

(52) U.S. Cl.
CPC .............. *G06T 7/97* (2017.01); *G06K 9/4671* (2013.01); *G06K 9/6211* (2013.01); *G06T 7/593* (2017.01); *H04N 13/122* (2018.05); *H04N 13/239* (2018.05); *H04N 13/25* (2018.05); *H04N 13/296* (2018.05); *G06T 2207/10012* (2013.01); *G06T 2207/20228* (2013.01); *H04N 2013/0081* (2013.01)

(58) Field of Classification Search
CPC .......... G06T 19/20; G06T 2207/10012; G06T 7/593; G06T 7/97; H04N 13/111; H04N 2013/0081; H04N 13/271; G06K 9/4671; G06K 9/6211
USPC ................ 382/154; 348/42, E13.014; 359/2; 356/2
See application file for complete search history.

(56) References Cited

U.S. PATENT DOCUMENTS

| | | | |
|---|---|---|---|
| 5,383,013 A * | 1/1995 | Cox ..................... | G06T 7/593 356/2 |
| 6,856,314 B2 | 2/2005 | Ng | |

(Continued)

*Primary Examiner* — Charlotte M Baker
(74) *Attorney, Agent, or Firm* — Muncy, Geissler, Olds & Lowe, P.C.

(57) ABSTRACT

A method for reducing matching errors in disparity images by information in zoom images is revealed. Images with different local length captured by two zoom cameras are given. Perform image and zoom rectification of the images to get a new image center. Then cross checking is used to check whether the corresponding points of each pixel in the image are matched for marking the pixel as a reliable point or an unreliable point. Computation of stereo matching cost is carried out when a reliable point is marked. Otherwise stereo matching and zoom image matching are performed. The matching cost is aggregated by weighting so as to select the matching cost that mostly represents the similarity. Use WTA to get final matching results and disparities thereof for disparity selection. Lastly use a median filter to remove noise from the image for disparity refinement and get a final disparity image.

7 Claims, 3 Drawing Sheets

(51) Int. Cl.
*H04N 13/296* (2018.01)
*H04N 13/239* (2018.01)
*H04N 13/25* (2018.01)
*H04N 13/00* (2018.01)

(56) References Cited

U.S. PATENT DOCUMENTS

```
8,009,897  B2    8/2011  Xu et al.
8,427,524  B2 *  4/2013  Jeong ................ G06K 9/32
                                              348/42
9,418,486  B2 *  8/2016  Cho .................. H04N 13/111
2014/0002605 A1  1/2014  Liao et al.
2017/0201736 A1* 7/2017  Ishimaru ............ G01C 3/06
```

* cited by examiner

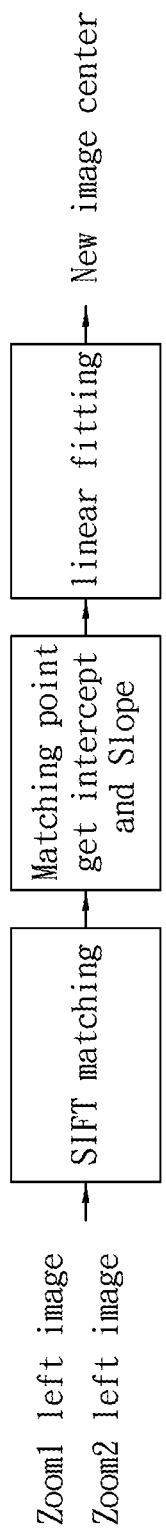
FIG. 3
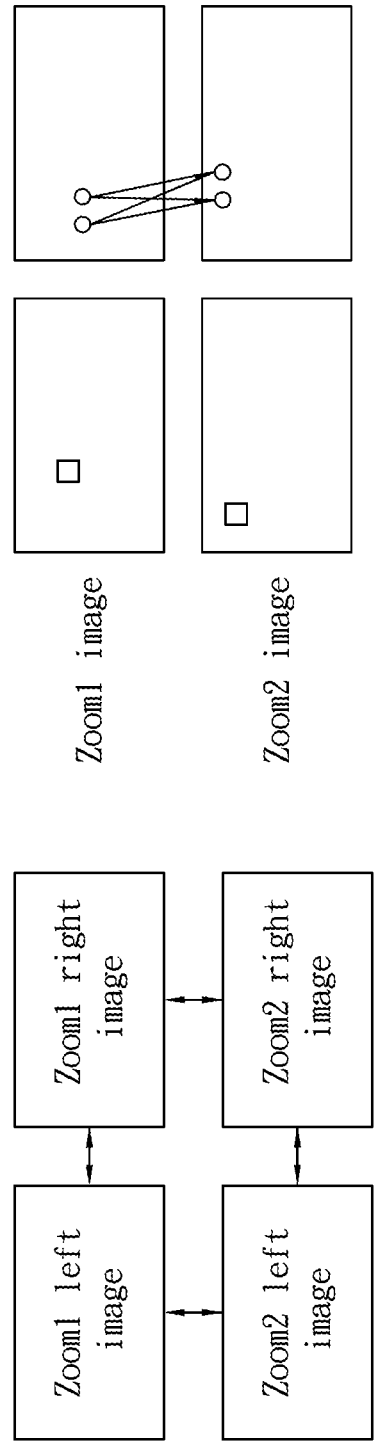
FIG. 5
FIG. 4

METHOD FOR REDUCING MATCHING ERROR IN DISPARITY IMAGE BY INFORMATION IN ZOOM IMAGE

BACKGROUND OF THE INVENTION

The present invention relates to a method for improving quality of disparity images, especially to a method for reducing matching errors in disparity images by information in zoom images (images with different focal length).

In the field related improvement of matching errors, there are some prior arts that improve disparity images by using the similar concept available now. For example, refer to U.S. Pat. No. 8,009,897 "Method and apparatus for image matching", the method and apparatus perform correspondence estimation between pixels of a stereo image pair to obtain matching information for corresponding pixels in each image. To perform a match for a particular pixel in a first image firstly an adaptive curve is constructed about the pixel, being a sequence of connected pixels with similar intensity values to the pixel being matched. Then the curve constructed is used as a matching element within the second image to finds a matching pixel representative of the same 3D scene point in the second image to the particular pixel. Thus accurate disparity maps can be obtained and used in an image synthesis algorithm to produce novel images with improved quality. Refer to U.S. Pat. No. 6,856,314 "Method and system for 3D reconstruction of multiple views with altering search path and occlusion modeling", the method receives a plurality of image features corresponded between different 2D views of the scene, the corresponded image features deviating between different views as a result of camera relative motion. The method propagates 3D depth information from the confident seeds to neighboring image features, while avoiding image features that have been determined to be occluded views. More information in the disparity image is obtained by a plurality of imaging devices for reducing matching errors of corresponding points. Refer to US Pub. No. 2014/0002605 "Imaging system and method", the imaging system includes a cross-checking module configured to cross check the disparity map and identify occlusion pixels in the disparity map, and an occlusion-refining module configured to refine the occlusion pixels for improving the disparity image.

For the techniques available now, more image information of the disparity image is obtained by using information in stereo image pairs each of which includes a left image and a right image for matching of corresponding points, or by increasing numbers of cameras to get more image information for reducing matching errors. Among prior arts that use information in a stereo image pair for matching of corresponding points, a common stereo vision algorithm uses information of an image pair captured by two cameras with different viewpoints to compute the matching cost for matching corresponding points and further calculate the disparity between the images. In the above method, the information used for matching only comes from the image pair captured. The matching cost computation based on limited information is easy to cause mismatching of feature points. That means matching errors occur easily when less image information is available.

As to prior arts related to using more cameras to get more image information for reducing matching errors, information in multi-view images captured by a plurality of cameras is aggregated to solve the problem of matching errors occurred in the image pair captured by two cameras respectively. More information in the images obtained is used to check similarity of the corresponding points and find out the most similar points in the reference image and other images. Then the disparity value of the most similar points is estimated. Thereby the percentage of the errors can be reduced by accurate matching in other image pairs even corresponding matching errors occur in one of the image pairs. However, the multi-view system developed for solving the problem of mismatching of the corresponding points has a major disadvantage that a plurality of cameras is required to take pictures. Obviously the hardware cost is increased. Although the matching errors are reduced due to increased image information obtained, the hardware cost is increased owing to more cameras required.

Thus there is room for improvement and there is a need to provide a novel method that gets more image information by zoom function of the camera for reducing matching errors, without increasing the hardware cost.

SUMMARY OF THE INVENTION

Therefore it is a primary object of the present invention to provide a method for reducing matching errors in disparity images by information in zoom images in which more image information is obtained by changing camera focus to solve the problem of the increased hardware cost. Not only the information in zoom images with different focal length and the information in the original image can be aggregated, various matching costs are also aggregated for reducing the match errors. The accuracy of the disparity image obtained by original algorithms is also improved through increasing amount of matching cost information.

It is another object of the present invention to provide a method for reducing matching errors in disparity images by information in zoom images in which a stereo matching algorithm is used for aggregating information in different zoom images and then the information in the zoom images is used for reducing percentage of matching errors per pixel of the original disparity image.

In order to achieve the above objects, a method for reducing matching errors in disparity images by information in zoom images according to the present invention includes the following steps. Step 1: Image pre-processing. Image pairs with different local length captured by two zoom cameras are given. Perform image and zoom rectification of the image pair to get a new image center. Step 2: Matching cost computation. The cross checking is used to check whether the corresponding points of each pixel are matched for marking the position of the pixel as reliable point or unreliable point. Computation of stereo matching cost is carried out when the pixel is marked as reliable. Otherwise stereo matching and zoom image matching are performed when the pixel is marked as an unreliable point. The matching cost is aggregated by weighting so as to select the matching cost that mostly represents the similarity. Step 3: Disparity selection. The matching cost information of the unreliable and reliable points has been set up in the above step. Use WTA to get final matching results and disparities thereof. Step 4: Disparity refinement. Use a median filter to remove noise from the image for smoothing and a final disparity image is obtained.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein:

FIG. 3 is a flowchart showing how to get the new image center according to the present invention;

FIG. 4 is a schematic drawing showing information integration according to the present invention;

FIG. 5 is a schematic drawing showing matching of candidate points according to the present invention;

DETAILED DESCRIPTION OF THE PREFERRED EMBODIMENT

In order to learn structure and features of the present invention more clearly, please refer to the following embodiments and the related figures.

The present invention uses optical flow to observe motion vectors of feature points or blocks between zoom images. Generally optical flow is a concept of the pattern of apparent motion of objects, surface and edges in a visual scene caused by movement of object, camera, or both. The followings are optical flow assumptions: (1) Brightness constancy: The apparent brightness of moving objects remains constant between the two adjacent frames. (2) Small motion: points do not move very far between two adjacent frames. (3) Spatial coherence: neighboring points in the same block of the scene typically have similar motions.

Figure 1:
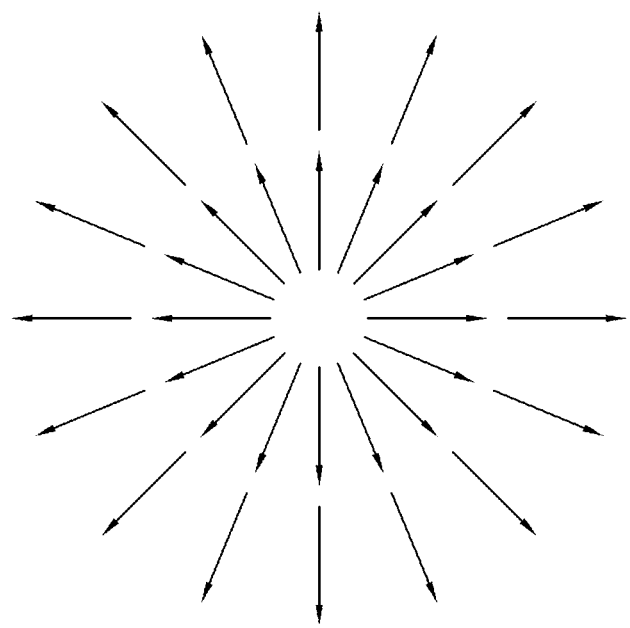
FIG. 1 is a schematic drawing showing optical flow of a zooming image according to the present invention.

As shown in FIG. 1, the motion vector determined by optical flow represents displacement of a block/feature point between two frames due to high correlation of the consecutive frames. That means the motion vector can be used for predicting the movement of the block/feature point of the previous frame to a certain position of the current frame. The method is often applied to video compression. As shown in FIG. 1, the movement of the corresponding blocks/or points in the zooming images is divergent but the divergent beams are coming from one focused point. Then the focused point and the positions of the pixels in the image are used for constraint. Thus corresponding points in the zooming images can be found out through the constraint in combination with local matching algorithm. The corresponding points found-out can be used to aggregate information in the original image and the zooming images so as to make the matching points in stereo images more strong and solid.

Figure 2:
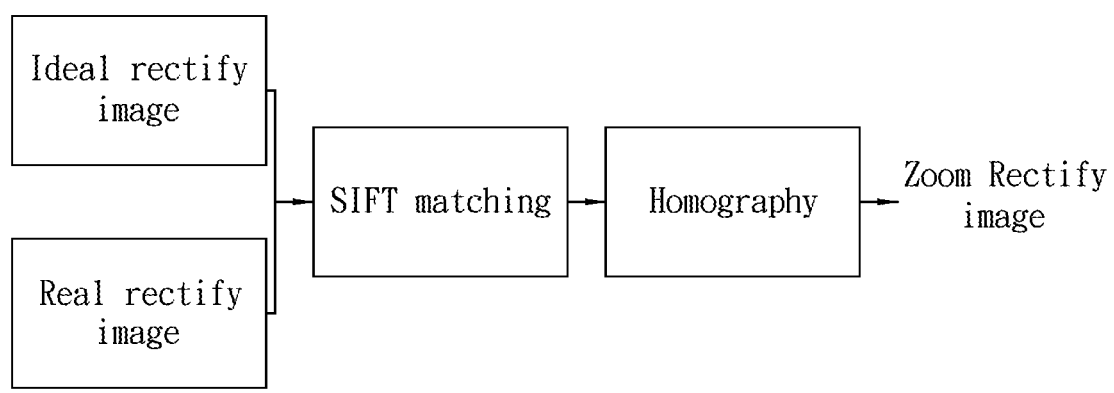
FIG. 2 is a flowchart showing steps of a zoom rectification method according to the present invention.

A flow chart of a method for reducing matching errors in disparity images by information in zoom images according to the present invention is described in the followings. The first is image pre-processing. A pair of images is given. The search range of corresponding points in the images can be reduced from two-dimensional image pixel point to one-dimensional image scanline through image rectification. In an ideal camera model, the zooming image plane is moved along the optical axis. In the applications of the present system, the plane of Zoom 1 image and the plane of Zoom 2 image are not parallel after image rectification due to internal structure of the camera and camera calibration. The image captured in the first focal length range is called the Zoom 1 image, and so are the Zoom 2, Zoom 3, etc. Under this condition, it's impossible to find out feature points by the divergence of the vector field. Thus the present invention provides a zoom rectification method to ensure corresponding points in the Zoom 1 image and the Zoom 2 image can be found out based on divergence of zoom vectors. In the zoom rectification method proposed, it is assumed that the image plane is moved along the optical axis while zooming. Thus the image center among the intrinsic parameters will not have changes along with the changing focal length. The extrinsic parameters used in the camera calibration will also not change since the two zoom image planes are in the same camera coordinate system. Thereby the ideal image plane after zooming can be obtained by performing the image rectification of the present invention again. Yet there is a difference between the image plane of the Zoom 2 image obtained through actual calibration parameter after image rectification, and the image plane obtained by rectification of the present method. The image information generated is also different. Thus the present invention needs transformation of the real image plane after image rectification into the ideal image plane. The image on the real image plane is transformed to the ideal image plane through a homography matrix to get a new Zoom 2 image, the rectified Zoom 2 image, after zoom rectification. Thereby the corresponding points in the Zoom 1 and Zoom 2 images can be searched through divergent vectors. The flow chart of the zoom rectification is shown in FIG. 2.

The new Zoom 2 image (the rectified Zoom 2 image) is obtained by the zoom rectification method mentioned above. Next Scale-Invariant Feature Transform (SIFT) together with K Nearest Neighbor (Knn) algorithm is used to get corresponding points in the image. In the present invention, the Zoom 1 left image and the new Zoom 2 left image are used as input images to get matching-point related information between the two images. The slope and the intercept of a line segment between two points are calculated by the information related to matching points. The best linear equation is found out by linear fitting and the best convergence point of all the vectors is further obtained. The convergence point is called the new image center in the present invention. The flowchart showing how to get the new image center is shown in FIG. 3.

The next is matching cost computation. A disparity image/map is obtained by the paired left image and right image given as input to a stereo vision algorithm.

The distance between two corresponding points in the left image and right image can be learned by the pixel information of the disparity image. Before disparity refinement, it should be understood that there are still errors in the disparity images generated by different stereo vision algorithms. A key solution is to correct pixel mismatch in the disparity images. Thus the present invention firstly keep the matched pixels and then check positions of the mismatched pixels for correcting the pixel mismatch in the disparity images. In the present invention, the mismatched pixels are labeled by a cross checking technique for the following computation and optimization. First a general stereo vision algorithm is presented to give a disparity image as output from the left image and the right image of a stereo image pair. Each pixel in the disparity image indicates the disparity/correspondence between the left image and the right image. By the cross-checking that computes matches left-to-right and right-to-left, pixels in one image are marked as reliable if they map to pixels in the other image which do not map back to them. The position of the pixel is labeled as a reliable point. Otherwise the pixel is regarded as unreliable and the position thereof is an unreliable point. This can be represented by the following equation (1).

$$R(x, y) = \begin{cases} 1, & D_L(x, y) = D_R(x - D_L(x, y), y) \\ 0 & \text{, otherwise} \end{cases} \quad (1)$$

The correspondence between the Zoom 1 image and the Zoom 2 image after zoom rectification meets the divergence condition.

Then the present invention uses information in the Zoom 2 image for achieving improvements on the unreliable points obtained by the cross checking. Firstly corresponding points in the Zoom 1 and the Zoom 2 images should be found out. The matching cost is calculated by a local adaptive support window (ASW) while homography matrix is used to reduce the searching range of the corresponding points. On the other hand, the mask with the same size is used for searching the corresponding points due to magnification of scenes/things in the zoom image. The matching errors occur easily due to different information in the images. In the present invention, the Zoom 1 image information is projected onto the image plane of the Zoom 2 image by homography matrix and the image projected is used for correspondence matching. The matching cost computation of the present invention is divided into two categories. One way is a general stereo matching method (as the horizontal arrow in FIG. 4 indicates) that is divided into local and global algorithms. The other way uses correspondence of zoom images for computing matching cost (as the vertical arrow in FIG. 4 indicates). First a left-image-disparity based on Zoom 1 left image and Zoom 2 left image is obtained by the general stereo matching method. A Winner-take-all (WTA) computing method is used for selection of corresponding points and disparity computation in the stereo matching of the present invention. However, the disparity obtained by the information related to the optimal matching similarity might have errors from the viewpoint of the disparity image. Thus the present invention not only extend the search range of the corresponding points into the information related to the second-most-similar and the third-most-similar matching cost, but also record the information related to the matching similarity of the first three most similar ones in the right image of each pixel, as shown in the following equation (2):

$$C_{1n} = \text{Cost}(i,j,d_n(i,j)), \ 1 \leq n \leq 3$$

$$C_{2n} = \text{Cost}(i',j',d_n(i',j')), \ 1 \leq n \leq 3 \quad (2)$$

wherein $d_n$ represents disparity between candidate points of the pixel at position (i,j), Cost means the matching cost of the corresponding points.

Then the present invention finds out corresponding points in the Zoom 1 and Zoom 2 images for connecting matching cost in many respects. The most similar corresponding points are found out by a method based on the zoom vectors, as shown in the following equation (3):

$$C = \text{Local}_{ASW}(Z_{1L}(i,j), Z_{2L}(i',j')), \ 1 \leq n \leq 3 \quad (3)$$

wherein $Z_{1L}(i,j)$ represents the position of the pixel at position (i,j) in the left image and so as $Z_{2L}$. Hereby local algorithms for matching cost computation including Sum of absolute intensity differences (SAD), Normalized Cross Correlation (NCC), etc. are all called "Local".

Once the correspondence between the zoom images and the matching cost information of the stereo image pairs with different focal length are obtained, the correlation of the corresponding points can be further determined by using matching cost among respective three candidate points of the Zoom 1 image and the Zoom 2 image. The matching cost that mostly represents the similarity is also selected by WTA. As shown in FIG. 5, the squares are corresponding points in the zoom images while the circles represent candidate points of the square pixel. The arrow indicates finding the correlation between the candidate points of Zoom 1 and Zoom 2, as shown in the following equation (4) and equation (5).

$$C_{nm} = \text{Local}(Z_{1R}(i + d_n(i, j), j), Z_{2R}(i' + d_n(i', j'), j')), \quad (4)$$
$$1 \leq n \leq 3, \ 1 \leq m \leq 3$$

$$M_n = \underset{m}{\text{argmin}} C_{nm}, \ 1 \leq n \leq 3, \ 1 \leq m \leq 3 \quad (5)$$

Lastly there are errors in selection of the corresponding points resulted from matching cost computation of Zoom 1 in stereo matching. Thus matching cost information of $C_{2M}$ (M makes $C_{nm}$ have the highest similarity), C and $C_{nm}$ is aggregated/integrated by weighting for solving the above problem, as shown in the following equation (6), $$\text{TotalCost}_n = \alpha C_{2M_n} + \beta (C + C_{nM_n}), \ 1 \leq n \leq 3 \quad (6)$$

The third part is disparity selection. The matching cost information of the candidate points of the unreliable and reliable points has been set up by the present invention. In order to select corresponding points with highest grey scale correlation, the present invention uses WTA to get the final matching results and disparities thereof, as shown in the equation (7).

$$\text{Matching Point} = \underset{n}{\text{argmin}} \ \text{TotalCost}_n, \ 1 \leq n \leq 3, \quad (7)$$

The last one is disparity refinement: lastly a median filter is used to filter noise in the disparity image for smoothing and a final disparity image is obtained.

Figure 6:
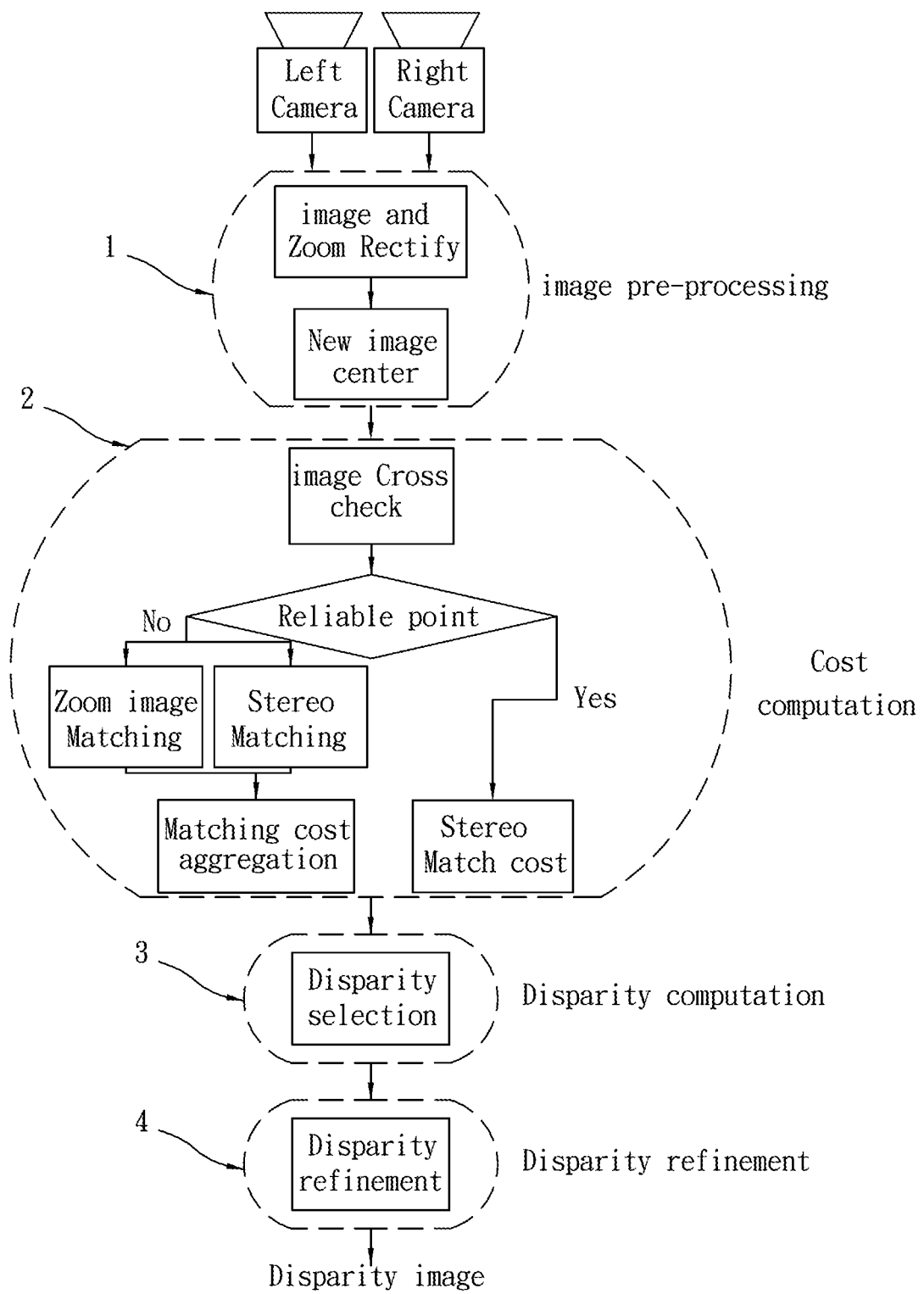
FIG. 6 is a system flowchart according to the present invention.

Refer to FIG. 6, a method for reducing matching errors in disparity images by information in zoom images according to the present invention firstly uses a left zoom camera and a right zoom camera to capture multiple stereo image pairs with different focal length and then uses information aggregation of different zoom images to improve the disparity images originally obtained by local and global stereo matching algorithms.

The present method includes the following steps. Step 1: Image pre-processing. Image pairs with different local length captured by the left and the right zoom cameras are given. Perform image and zoom rectification of the images to get a new image center.

Step 2: Matching cost computation. The cross checking is used to check whether the corresponding points of each pixel in the image are matched for marking the position of the pixel as reliable point or unreliable point. Computation of stereo matching cost is carried out when the point is marked as reliable (the yes pathway). Otherwise stereo matching and zoom image matching are performed when the point is not reliable and marked as an unreliable point (the no pathway). The matching cost is aggregated by weighting so as to select the matching cost that mostly represents the similarity.

Step 3: Disparity selection. The matching cost information of the candidate points of unreliable and reliable points has been set up in the above step. Use WTA to get final matching results and disparities thereof.

Step 4: Disparity refinement. Use a median filter to remove noise from the image for smoothing and a final disparity image is obtained.

In summary, the present invention provides a method for reducing matching errors in disparity images by information in zoom images in which image pairs with different focal length (zoom images) are captured by zoom cameras. Information in the zoom images is aggregated to reducing errors in original disparity image obtained by local and global stereo matching. Moreover, zoom rectification method is proposed by the present invention to find out corresponding points of the zoom images accurately by zoom vectors. The present invention not only compares percentage of the matching errors of disparity images derived from the real image but also tests the present method by using various images obtained by Middlebury dataset with digital zoom. The test results show that the present method used in combination with local and global stereo matching algorithms do reduce the percentage of the matching errors significantly. In the local stereo matching algorithm, smooth blocks with large disparity have worse results and the percentage of matching errors (bad matching pixels) thereof is a bit increased.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A method for reducing matching errors in disparity images by information in zoom images comprising the steps of:
    Step 1: pre-processing images by capturing at least two images pairs including a zoom 1 image pair and a zoom 2 image pair with different focal length by a left zoom camera and a right zoom camera and then performing image and zoom rectification of a zoom 1 image and a zoom 2 image to find out a new image center;
    Step 2: computing matching cost by using cross checking to check whether corresponding points of each pixel of a disparity image are matched for marking a pixel as a reliable point or an unreliable point; carrying out computation of stereo matching cost when the pixel is marked as a reliable point otherwise performing stereo matching and zoom image matching when the pixel is not reliable and marked as an unreliable point; aggregating the matching cost by weight so as to select the matching cost that mostly represents the similarity;
    Step 3: selecting disparity by setting up matching cost information of candidate points of the unreliable and reliable points and then using a Winner-take-all (WTA) computing method to get final matching results and disparities thereof; and
    Step 4: refining disparity by using a median filter to remove noise from the disparity image and smoothing the disparity image, and generating a final disparity image from the refined disparity image.

2. The method as claimed in the claim 1, wherein the step 1 further includes a method for zoom rectification that includes the steps of:
    giving at least two image pairs including a Zoom 1 image and a Zoom 2 image; wherein the Zoom 1 image is the image captured in the first focal length range and so are other Zoom images;
    assuming that an image plane is moved along an optical axis while zooming and two planes of the Zoom 1 and the Zoom 2 images respectively are in the same camera coordinate system; performing image rectification again to get an ideal image plane after zooming;
    using Scale-Invariant Feature Transform (SIFT) matching to transform a real image plane after the image rectification into the ideal image plane; and
    transforming an image on the real image plane to the ideal image plane through a homography matrix to get a rectified Zoom 2 image so that corresponding points in the Zoom 1 image and the rectified Zoom 2 image can be searched by divergent vectors.

3. The method claimed in claim 2, wherein the method for zoom rectification further includes the steps of:
    using a left image of the Zoom 1 image and a left image of the rectified Zoom 2 obtained thereby as input images and Scale-Invariant Feature Transform (SIFT) together with K Nearest Neighbor (Knn) algorithm to get corresponding points in the Zoom 1 image and the rectified Zoom 2 image, as well as matching-point related information between the Zoom 1 image and the rectified Zoom 2 image;
    getting a slope and an intercept of a line segment between two points by the matching-point related information;
    finding out the best linear equation by linear fitting and further obtaining the best convergence point of all the vectors while the convergence point is defined as the new image center.

4. The method as claimed in claim 1, wherein a search range of the corresponding points is extended to information related to second-most-similar and third-most-similar matching costs while information related to the matching similarity of first three most similar matching costs in a right image of each pixel, as the following equation indicates, is also recorded:

$$C_{1n}=\text{Cost}(i,j,d_n(i,j)), 1 \leq n \leq 3$$

$$C_{2n}=\text{Cost}(i',j',d_n(i',j')), 1 \leq n \leq 3$$

wherein $d_n$ represents disparity between candidate points of a pixel at position (i,j), Cost means the matching cost of the corresponding points.

5. The method as claimed in claim 4, wherein the most similar corresponding points are found out by a method based on zoom vector, as the following equation indicates:

$$C=\text{Local}_{ASW}(Z_{1L}(i,j),Z_{2L}(i',j')), 1 \leq n \leq 3$$

wherein $Z_{1L}(i,j)$ represents the position of the pixel at position (i,j) in a left image of the Zoom 1 image and so as $Z_{2L}$; wherein local algorithms for matching cost computation are all called "Local".

6. The method as claimed in claim 5, wherein a correlation of the corresponding points is further determined by using matching cost among respective three candidate points of the Zoom 1 image and the rectified Zoom 2 image; the matching cost that mostly represents the similarity is selected by WTA; wherein finding out the correlation between the candidate points of the Zoom 1 image and the Zoom 2 image is represented by the following equations:

$$C_{nm} = \text{Local}(Z_{1R}(i+d_n(i,j),j), Z_{2R}(i'+d_n(i',j'),j')),$$

$$1 \le n \le 3, \quad 1 \le m \le 3$$

$$M_n = \underset{m}{\text{argmin}} C_{nm}, \quad 1 \le n \le 3, \quad 1 \le m \le 3.$$

7. The method as claimed in claim 6, wherein matching cost information of $C_{2M}$, C and $C_{nM}$ are used and aggregated by weighting for solving the problem of errors in selection of the corresponding points, as the following equation indicates:

$$\text{TotalCost}_n = \alpha C_{2M_n} + \beta(C + C_{nM_n}), \quad 1 \le n \le 3$$

wherein M makes $C_{nM}$ have the highest similarity.

* * * * *